United States Patent

Adams, Jr. et al.

[11] Patent Number: 6,017,219
[45] Date of Patent: Jan. 25, 2000

[54] SYSTEM AND METHOD FOR INTERACTIVE READING AND LANGUAGE INSTRUCTION

[75] Inventors: Hugh Williams Adams, Jr., Wappingers Falls; Subrata Kumar Das, Granite Springs; Peter Gustav Fairweather, Yorktown Heights; Don Holmes Nix, Sleepy Hollow, all of N.Y.

[73] Assignee: International Business Machines Corporation, Armonk, N.Y.

[21] Appl. No.: 08/877,912

[22] Filed: Jun. 18, 1997

[51] Int. Cl.[7] .............................. G09B 17/00; G09B 17/04
[52] U.S. Cl. ........................... 434/178; 434/179; 434/185; 704/270
[58] Field of Search ...................................... 434/178, 179, 434/180, 185; 704/231, 246, 251, 270

[56] References Cited

U.S. PATENT DOCUMENTS

| | | |
|---|---|---|
| 4,078,319 | 3/1978 | Mazeski et al. . |
| 4,397,635 | 8/1983 | Samuels . |
| 4,922,538 | 5/1990 | Tchorzewski ............................ 704/247 |
| 5,033,966 | 7/1991 | Behunin .................................. 434/179 |
| 5,083,924 | 1/1992 | Cochran et al. ......................... 434/178 |
| 5,365,434 | 11/1994 | Figliuzzi . |
| 5,540,589 | 7/1996 | Waters ..................................... 434/156 |
| 5,621,849 | 4/1997 | Sakurai et al. ........................... 704/231 |
| 5,636,325 | 6/1997 | Farrett .................................... 704/258 |
| 5,766,015 | 6/1998 | Shpiro ..................................... 434/156 |

OTHER PUBLICATIONS

"Demonstration of Reading Coach that Listens", J. Mostow et al, Proceedings of the ACM Symposium on User Interface Software and Technology, pp. 77–78, Nov. 1995.
"Demonstration of Reading Coach that Listens" J.Mostow, et al, *Proceedings of the ACM Symposium on User Interface Software and Technology*, pp. 77–78 (Nov. 1995).

*Primary Examiner*—Robert A. Hafer
*Assistant Examiner*—John Edmund Rovnak
*Attorney, Agent, or Firm*—Kevin M. Jordan; Anne Vachon Dougherty; Wayne L. Ellenbogen

[57] ABSTRACT

A reading or language interactive system which utilizes a mechanism to permit a computer-based instruction program in reading or language instruction to implement a shared reading program, wherein portions of the text are read by the student and portions by the computer itself. The proportion of the text "read" by each participant and the pace at which the lesson progresses can each be automatically altered based upon the proficiency of the student. In addition, the system utilizes a computer instructor to share the task of reading or language learning by modeling the task for the learner, variably controlling the amount of material that the student reads aloud based upon a computer assessment of the student's ability, helping the learner navigate through the instructional application, and participating in a joint performance that demonstrates the student's reading.

32 Claims, 4 Drawing Sheets

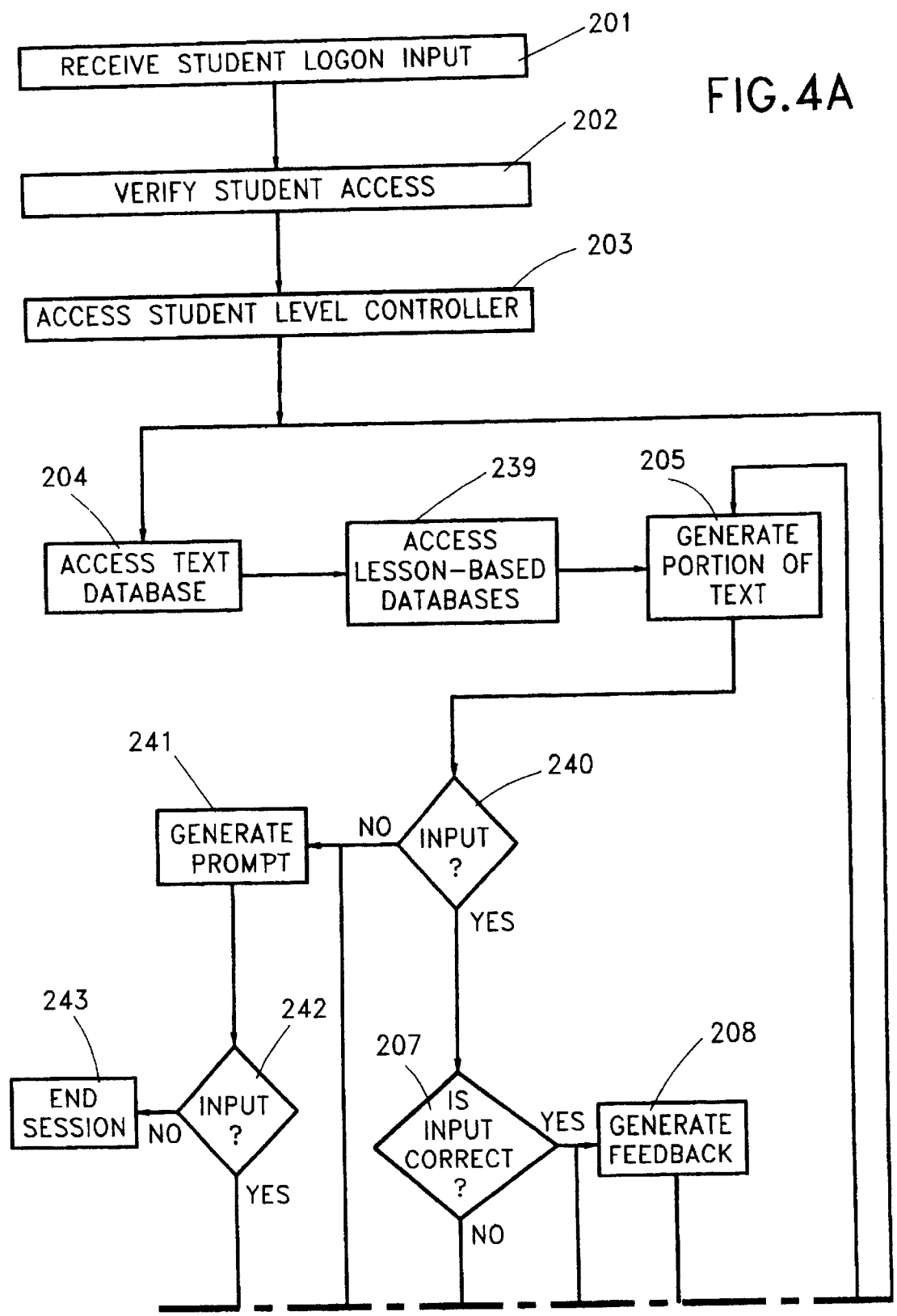

SYSTEM AND METHOD FOR INTERACTIVE READING AND LANGUAGE INSTRUCTION

FIELD OF THE INVENTION

This invention relates to computer-based instruction and more particularly to the use of computers having speech recognition software uniquely provided to simulate continuous speech recognition of juvenile speech in order to teach reading and/or language. The system further provides an interactive, variably-paced course of instruction, the progress of which can be automatically adjusted, and provides for uploading or display of the lesson workproduct at any time during or after completion of a lesson.

BACKGROUND OF THE INVENTION

Computer instruction for reading and language was first implemented in the 1970s and has progressed in complexity with developments in the technology. An early system, as detailed in U.S. Pat. No. 4,078,319 of Mazesli, et al, utilized optical components to train the student's eyes to focus on particular material and to advance laterally along the line of material to be taught, thereby teaching the mechanics of reading. Increasingly sophisticated systems incorporated audio presentation of the material to be learned, thereby simulating a human instructor and providing a degree of passive error control and correction. Systems which provide audio presentation are particularly well suited for foreign language instruction.

A reading teaching system having simultaneous audio and visual display of material is taught in U.S. Pat. No. 4,397,635 of Samuels, wherein the audio and/or the visual display of the material is altered to enhance the student's understanding of the meaning of the material to be learned (e.g., lower volume audio and downwardly-slanted lettering would be used in presenting the word "down"). Yet more complex is the system described in U.S. Pat. No. 5,540,589 of Waters, wherein voice recognition is utilized for instruction and for monitoring of a student's progress. The Waters system is designed to repeat material which is incorrectly "learned," as evidenced by recognized vocal responses, and to recommend termination of a session if errors exceed a preset fault tolerance.

A particular challenge associated with speech recognition systems, and critical to successful implementation of an automatic interactive reading system for a young child, is development of a children's speech model. Due to the range of pitch of children's voices, the irregular and unpredictable pace at which small children utter sounds, syllables, words and phrases, often without pausing to breathe where an adult would pause, their uncertain articulation, and the often strong influence of foreign languages spoken at home, prior art speech recognition systems have been unsuccessful at effectively recognizing speech uttered by children. Additional challenges to speech recognition include pronunciation variations attributable to regional dialects, foreign accents, common articulation problems, and idiosyncracies associated with various stages of speech development. An automatic interactive reading/language system must be able to address the foregoing challenges in order to be productive.

It is desirable to develop a system which will not only provide audio presentation and speech recognition, but also provide an interactive environment in which the tempo of presentation of material can be automatically adjusted to accommodate the student's level of skill and advancement through the program, wherein the student, and particularly a juvenile student, may participate with the program with increasing interaction as proficiency increases. Also desirable, for purposes of independent review, entertainment, and reward, is a system which can display the workproduct of each lesson by uploading and/or local display of the interactively-created presentation.

It is therefore an objective of the present invention to provide a computer-based reading or language instruction system and method, incorporating speech recognition software, for interpreting the student responses, interacting with the student, and altering the pace of the instruction based upon the student's responses.

It is a further objective of the invention to incorporate means for correcting student responses and audibly generating the correct responses as a means for simulating the activities of a teacher.

Yet another objective of the invention is to provide a system incorporating a database having lessons with varying degrees of student interaction to automatically increasingly challenge the learner and means to present those lessons in varied ways depending upon the proficiency of the student.

Another objective of the invention is to provide a speech recognition database to enhance recognition of children's speech and speech which is otherwise difficult to recognize.

Still another objective of the invention is to provide a system which will coordinate and display a joint performance of the inputs contributed by the student and the computer instructor in such a manner as to illustrate the student's reading or language proficiency.

SUMMARY OF THE INVENTION

The above and other objectives are provided in the present invention which utilizes a mechanism to permit a computer-based instruction program in reading or language instruction to implement a shared reading program, wherein portions of the text are read by the student and portions by the computer itself. The proportion of the text "read" by each participant and the pace at which the lesson progresses can each be automatically altered based upon the proficiency of the student. In addition, the system represents a computer companion to share the task of reading or language learning by modeling the task for the learner, variably controlling the amount of material that the student reads aloud based upon a computer assessment of the student's ability, helping the learner navigate through the instructional application, and participating in a joint performance that demonstrates the student's reading.

The foregoing are accomplished by providing a system having an executive program, for administration and execution of the shared reading program; audio input means having associated speech recognition means with access to a plurality of databases, including a database built upon a unique acoustic model for simulating continuous recognition of speech and at least one lesson-based speech recognition database; optional non-speech input means; and lesson output means. The executive program generates a computer instructor, perhaps an animated character, that asks the student questions, directs reading tasks, reads what the student does not read, and helps navigate the student through the application via the lesson output means, including audio and optional visual outputs. The system is provided with a plurality of databases including at least a database of textual fragments, organized by attributes such as difficulty and position, and means for defining sections for the student to read and sections for the computer instructor to read; and the aforementioned lesson-based databases of anticipated responses, including multiple variations of groupings of sounds in the responses and anticipated mispronunciations, for speech recognition.

BRIEF DESCRIPTION OF THE DRAWINGS

The invention will now be described in further detail with specific reference to the attached figures wherein.

DESCRIPTION OF THE PREFERRED EMBODIMENT

Figure 1:
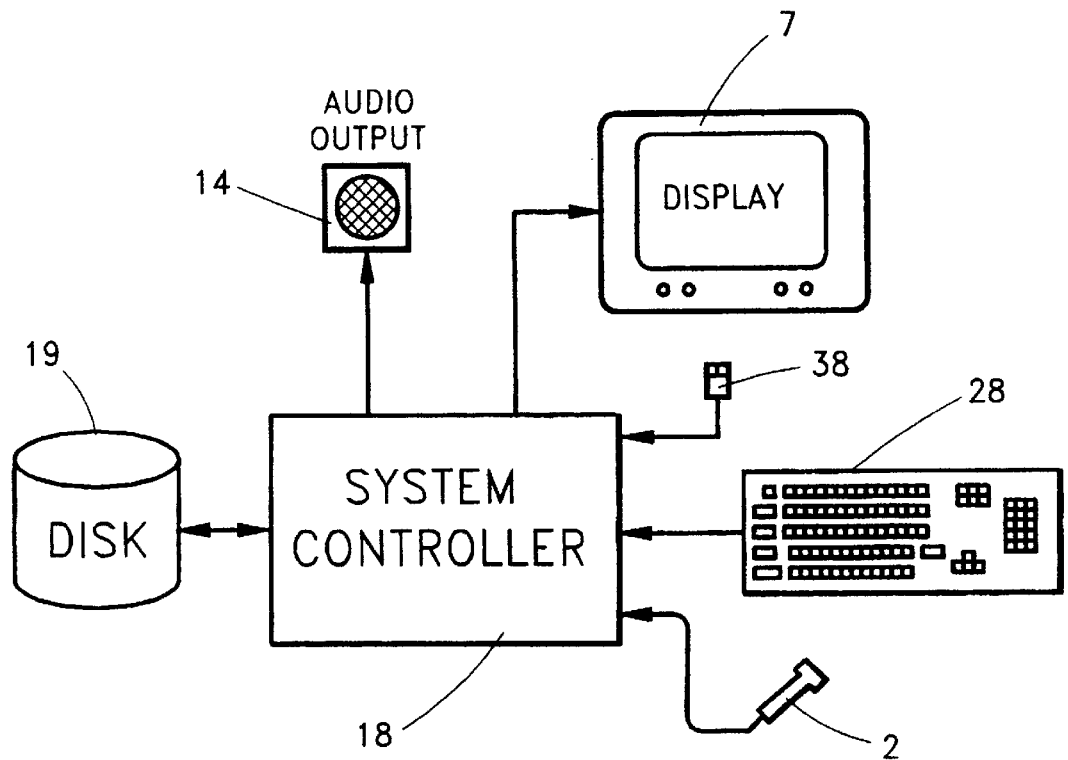
FIG. 1 illustrates a basic block diagram of the inventive system.

The invention, in its most basic embodiment as illustrated in FIG. 1, comprises a system controller 18, comprising an executive program having access to information stored in one or more storage locations, illustratively depicted as disk 19. It is to be noted that internal or external storage means other than disk storage could clearly be utilized, provided that the executive program can readily access stored data and/or applications. Textual or instructional input from a student user to the system controller is provided via one or more non-speech user inputs, shown representatively as keyboard 28 or mouse 38, while audio input is provided via microphone 2. Output from the system controller for interaction with the student is provided as video output at the graphical user interface, display 7 or as audio output via speaker 14. Combination of components in stand-alone systems, or omission of one of the input or output devices, is common practice which may affect the necessary software available to the system controller, but would not alter that which is novel to the present system. A most basic implementation of the instruction system may incorporate only audio input and output means, with visual student stimuli being provided by a physical textbook or storybook. The essence of the invention concerns the particulars of the databases, the actions of the executive program and the actions of the speech engine. The other illustrated or mentioned components deserve no further detailed attention except insofar as they provide a context for clarifying the necessary details of the invention. From the student user perspective, a representative system would comprise a personal computer having a keyboard and/or a mouse for controlling the pointing device (8 of FIG. 2), a monitor, one or more speakers and a microphone. The student may or may not be required to load a program from a CD-ROM or diskette, or download same from a dedicated network or the internet, depending upon the specific embodiment.

Figure 2:
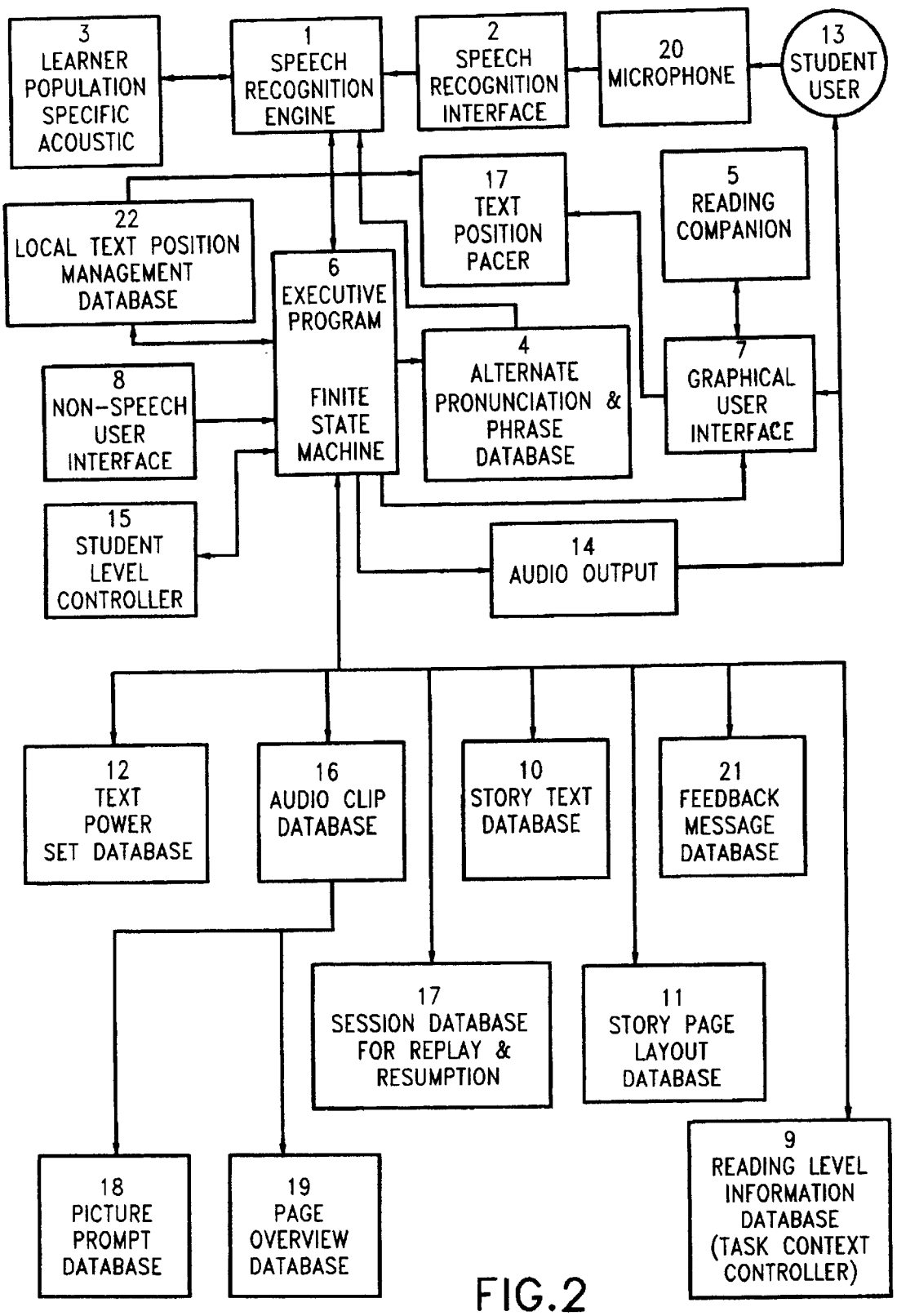
FIG. 2 schematically illustrates the system controller components and the intercommunications paths among same.

The executive program orchestrates the instruction and interaction between the student user and the system, and requires access to additionally stored databases of relevant information, representatively depicted at the storage locations on disk 19 of FIG. 1. While the databases of stored information are detailed below, it will be understood by one having skill in the art that the specific contents of the databases may vary slightly without departing from the intent of the invention. In addition, it is clear that the information may be combined into one or more larger databases, provided that all of the information remains accessible in the system. The databases, with reference numerals related to FIG. 2, are as follows:

reading level information database 9—controls information representing the user's recent performance and current level which information is used to change the amount of support given to the user during his or her reading;

story text database 10—includes the text of the story and phrasing indicators that are used to break up the text and control the amount of material that the learner is asked to read;

story page layout database 11—includes information regarding the number and dimensions of the pages, the positioning of text blocks and their sequencing, the positioning and size of graphics, and the coordinates used for routing the companion around the screen;

session database for replay and resumption 17—contains all the information necessary to provide a replay of the joint reading of the text by the companion and the student, including the portions read correctly by the student, and the portions read by the computer instructor/companion, along with information about audio annotations to the text, and an optional video introduction to the joint reading performance. This database also allows the student to resume the session at a later time, and enables storage of the session for uploading and transmission or for local review at a later time;

audio clip database 16—indexes a digital representation of the audio for all feedback and directional messages, words, and phrases by their textual form;

picture prompt database 18—contains pointers to audio information maintained in the audio clip database such that by student selection of a picture function, the system will generate an audio expression of what the picture represents in terms of the overall story;

page overview database 19—contains pointers to audio information maintained in the audio clip database such that by student selection of the page overview function, the system will generate an audio expression of what the contents of the page mean to the overall story;

feedback message database 21—contains all feedback messages designed to offer information to the student, categorized as to the type of message, such that messages within a given category are selected randomly from that category for delivery when appropriate;

learner population-specific acoustic model 3—an acoustic representation of children's speech that is used by the speech recognition engine to enhance recognition of children's speech and assist in assigning a textual interpretation to the received speech signals;

alternate phrase and pronunciation database 4—a phonemic representation of different ways to pronounce words in the currently active vocabulary (i.e., in the text which is being read at any given time);

text power set database 12—a phonemic representation of the power set of contiguous words in the text which is being read at any given time to effect pseudo-continuous speech recognition;

student level controller 15—changes the level of the reading task based on information contained in the reading level information database so that students receive more examples of the reading being modeled and are asked to read relatively smaller portions of the text as the level decreases, and vice versa as the level increases; and local text position management database 22—contains all information regarding the current point of reading which is used for managing the cursor or for determining whether a word has been read.

The paths for communications and information handling among the various system components, applications and databases are representatively illustrated in FIG. 2 and will be detailed in the following description of the operation of the system. When initiating a lesson (and throughout the lesson), the executive program 6 receives input from the student user via the non-speech user input interface 8 (i.e., a mouse, keyboard, touchpad, touchscreen, or other known non-speech input device) and/or from microphone 20 via the speech recognition interface 2 and speech recognition engine 1. The speech recognition engine will be provided with information from the learner population specific acoustic model 3, the alternate pronunciation and phrase database 4, and the text power set database 12 for stored information to facilitate recognition of the audio input.

The learner population specific acoustic model assists the speech recognition engine in simulating continuous recognition of the learner population's, representatively children's, speech. Given the idiosyncracies of the speech of the anticipated users, an acoustic model of that speech is provided to enhance recognition. As noted in the Background section, the idiosyncracies of children's speech generally defy recognition on a continuous speech basis, and the acoustic model for purposes of this description is that of children's speech. If the anticipated user group is adult, adult with particular speech disorders, adult with a given foreign accent, teen, etc., an appropriate acoustic model can be developed accordingly.

The alternate phrase and pronunciation database 4 and the text power set database 12 are additionally provided to enhance recognition of the uttered responses. Both of these latter databases, 4 and 12, are based upon the text of the story to be read. As the executive program is providing a portion of the text for display to the student user, or directing the student's attention to a particular page of text in the embodiment having no computer-based visual output means, the alternate phrase and pronunciation versions of that text, and the power sets of that text are provided to the speech recognition engine in order to assist in interpretation of the responses uttered by the student user.

The text power set database is developed based on the fact that certain anticipated users (and, again representatively children, though it may well apply to teen and adult users) may not breathe or pause between words or phrases, thereby rendering continuous speech recognition ineffective. In order to make discrete speech recognition effective for those anticipated users, power sets of contiguous words, which might be run-together, are developed and provided in the text power set database.

To develop the text power set database, knowing that it is not realistic to have all of the anticipated users train the speech recognition system, the database is generated independently and preferably automatically. In so doing, the signals for phoneme sequences in the text are input and variations of the phoneme sequences are generated as the contents of the database. As such, for example, the phrase "the dog barks" may be stored in the text power set database as "thedog barks", "the dogbarks", "thedogbarks" and "the dog barks". The phoneme sequences which are stored can, clearly, also include portions of words, separated at logical syllabic breaks. As might be expected, by providing many alternative correct responses, one is broadening the interpretation space around the text. As a result, many more utterances will be recognized as correct than would have been when using the speech recognition engine alone. The alternate phrase and pronunciation database is, therefore, provided to assist in re-narrowing the search space about the actual text.

The alternate phrase and pronunciation database provides both alternative correct pronunciations (e.g., "aks" for "ask") but also anticipated miscues for pronunciation of the text (e.g., "dark" for "bark"). By accessing the alternate phrase and pronunciation database, the speech recognition engine can reject incorrect utterances which would otherwise be accepted based upon the broader text power sets. Automatic generation of the alternate phrase and pronunciation database requires training the system in linguistic knowledge including: common pronunciation problems, such as running adjacent consonant sounds together; common reading problems, such as seeing "was" as "saw"; common substitutions of letters, such as "b", "d", "p" and "q"; etc. all based upon the known text of the lesson.

By iteratively building the databases based not only upon correct responses, but also upon variant combinations of contiguous correct responses and of anticipated mispronunciations influenced by age, foreign accent, regional dialect, etc., of the correct responses based on the text, the system is able to discretely recognize the speech as if it is being continuously recognized. The databases capture all anticipated variants and combinations of sentences, phrases, words, syllables, and sounds which could logically be uttered based upon the portion of the text being viewed for reading. Speech recognition therefore becomes a much less complex matching problem when the universe of possible utterances is bounded by sets of anticipated responses.

In response to student initiation of a lesson, the executive program will receive input from the student level controller 15 to determine the level of shared language lesson to be presented. The student level controller, 15, in turn retrieves input from the reading level information database, 9, concerning the user's most recent performance and current level of lesson. The levels of lesson range from a beginner level, at which all of the lesson is read by the computer instructor/companion, to the most advanced level, at which the student performs all of the reading. Levels in between have the computer instructor reading part of the textual segments, with the student reading the remaining portion(s) in shared reading interactions. For the sake of this description, a juvenile student will be assumed, and the lesson through which the student will be guided is the reading of an early-reader storybook.

Once the executive program has determined an appropriate level for the lesson, the lesson in retrieved from associated databases, including the story text database 10, audio clip database 16 (if real-time speech synthesis is not available to the executive program), and story page layout database 11. At the same time, the executive program generates the reading companion 5 to instruct the student through the lesson. Text segments with page graphics are provided for viewing by the student at the graphical user interface 7, with accompanying audio output provided at 14, while appropriate text-based information from the alternate phrase and pronunciation database 4 and the text power set database 12 is provided to the speech recognition engine. As noted above, an alternative embodiment for providing instruction at a lesser cost may eliminate the visual display, relying upon the student's attention to a physical textbook, as cued via the audio output of the computer.

For our early reader example, the illustrated book cover would be displayed along with an audio introduction. The student could then prompt the system, for example by clicking on a page icon, to open the book to begin the story. The page icon remains available to the student, in a continuously-displayed task bar, to turn the page and proceed with the story, or even to skip pages, at any time. Additional icons or words may be displayed continuously for prompting the system to perform an alternative function, as will be further described below.

For beginner and intermediate level lessons, visually displayed text segments will be accompanied by simultaneously rendered audio presentation of the text segments from audio output 14. As noted above, the audio text segments may be synthesized in real time by the executive program or retrieved from the audio clip database 16 and synchronized to the visual output by the executive program. For our early reader example, it is presumed that display of the text will always be accompanied by the story illustrations, ideally with the exact visual layout of the storybook being reproduced on the computer monitor.

The positional pacer 17, with input from the local text position management databases 22, may be implemented to continuously prompt the student along the text, identifying (e.g., "follow the bouncing ball") the word that is being read by the computer instructor or is to be pronounced by the student. In addition, the executive program may highlight or color differentiate the text to be read by the computer and that to be read by the student. At each juncture of the lesson at which the student is to utter one or more text segments, the user's input is provided to the speech recognition interface 2 as described above. Correct input may be passively acknowledged, simply by the progress of the lesson to the next text segment, or actively acknowledged by audio output generated via access to the feedback message database 21. Rapid progress, as sensed by the positional pacer, will cause the positional pacer to increase the tempo of the lesson. If the user correctly pronounces the "current" (e.g., highlighted) word before the pacer reaches the boundary between that word and the next word (the right boundary for standard left-to-right English reading), the pacer will accelerate slightly. Similarly, if the pacer reaches the boundary before the user pronounces the word, the pacer will slow its overall rate slightly. As will be understood by one having skill in the art, the pacer function can be implemented as a separate pacer task or pacer subroutine of the executive program.

Throughout the lesson, the audio inputs from both the student and the computer instructor, along with the text as displayed for utterance by each party, are stored at the session database for replay and resumption 17. After a lesson has been completed, the student may enjoy a reprise of the lesson to review progress and to identify areas for concentrated effort in the future. Storage and optional uploading of the lesson, in edited or unedited form, can be provided for independent instructor, peer, parent or personal student review of the lesson or for remote or deferred monitoring of progress (e.g., in the context of a correspondence-type course wherein an instructor or evaluator may review the performance). The aforementioned editing may refer to system incorporation of re-read and corrected utterances into the stored performance, and/or insertion of visual or audible annotations (e.g., "This was the easiest page!") provided from the student by invoking an annotation function. The executive program may also compile lists or annotate precompiled lists of words in the text which have been successfully read or missed. All of the foregoing can facilitate independent review of the student's progress.

During a lesson, the student user may alternatively select from one or more options to review the lesson to date or to select "help" for audio assistance. To review the lesson, for example, the student would click on a "playback" icon, or otherwise input the appropriate trigger. In response, the executive program would access the session database for replay and resumption 17. As is evident from the name of the database, as well as from its described functionality, a student may return to a particular lesson and resume that lesson at the point at which they last exited the lesson, rather than having to repeat all of their previous work, by accessing a previous lesson stored at 17.

Databases 18 and 19, the picture prompt database and page overview database, respectively, may be accessed when the student user selects an appropriate icon to receive audio "help." Specifically, in accordance with one embodiment of the invention, in response to the student clicking on a particular illustration or part of an illustration on the displayed storybook page, the executive program will access the picture prompt database 18 to generate an audio expression of what that illustration or part of the illustration means or represents in the context of the story. Similarly, it the student reader wishes to know how an entire page fits into the story, the student can click on an icon to retrieve the requested page information from the page overview database for audible presentation. If a student is having difficulty in reading/pronouncing a particular word, the student may request help for that one word at any time.

Figure 3:
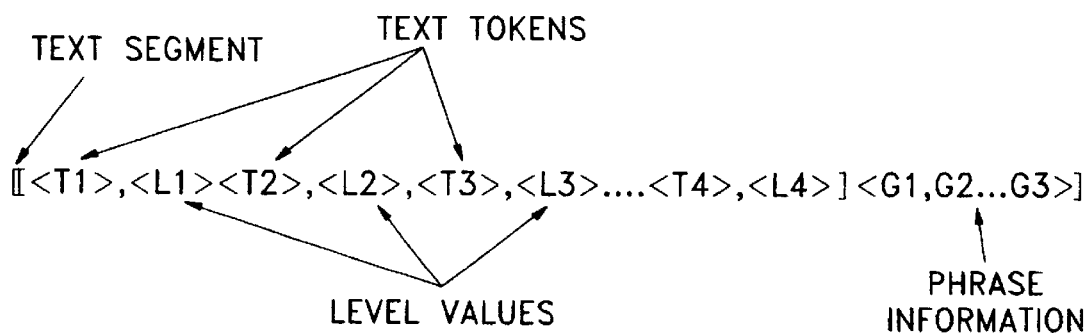
FIG. 3 illustrates the textual database support for shared language learning.

As the student progresses through the lessons in the application, the executive program 6 regularly updates the reading level information database 9 with a revised estimate of the student's competency based upon his or her performance. Each update that changes the estimate can potentially change the manner in which the reading or speaking of a textual segment will be shared for the present lesson or future lessons. If the estimate of the student's ability improves, the interaction between the computer instructor and the student may move from level N (where all but the last N words in a text segment are "read" by the computer instructor) to level N+1. Each level of interaction is associated with a pattern of shared initiative that is applied to a given text segment as illustrated in FIG. 3. A feature can also be implemented whereby the student can select the lesson level prior to commencing, or at any time during, the session.

FIG. 3 abstractly describes the layout and types of information maintained in the story text database 10, showing that each word token, depicted as 27 in text segment 28, is present along with a level indicator 29 which is used to determine whether the student is being asked to read or pronounce the token or whether it is being supplied by the computer instructor. Under this unique text storage scheme, only a single version of the text must be stored, from which a myriad of different renderings (i.e., combinations of shared reading between the instructor and the student user) of the text can be generated. The executive program interprets the level values and phrase information in the text database for each token to yield the interaction for a particular text segment. This interpretation defines exactly what is supposed to be read by the computer instructor and what is to be read by the student. Each level applies a different interpreter to the text segment to yield the interaction for that level.

Figure 4B:
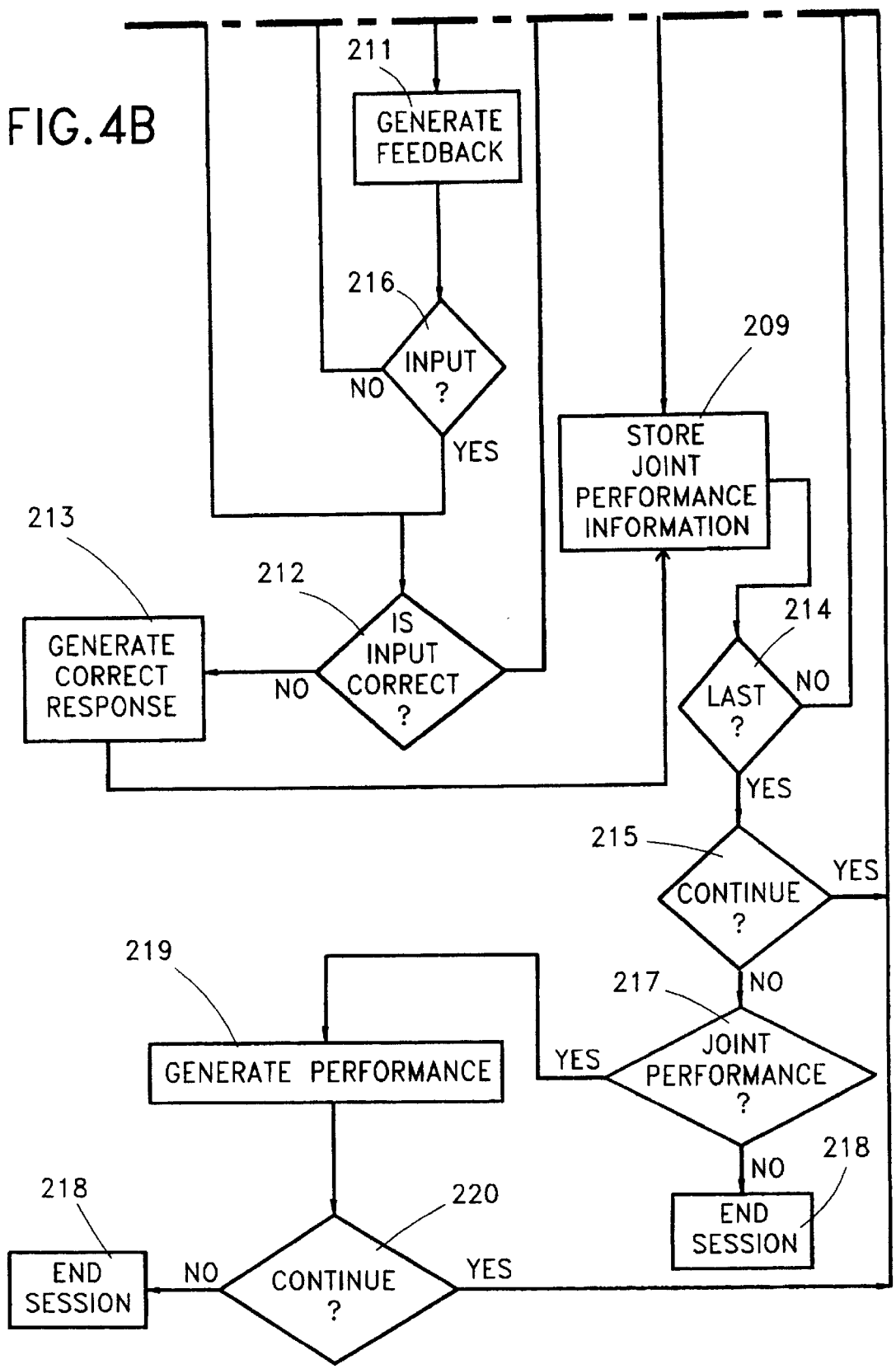
FIG. 4 provides a representative flow chart of tasks for the executive program.

FIG. 4 provides a representative process flow through which the executive program will progress in a typical lesson. At box 201 the executive program receives student logon or session commencement input, followed by an optional step, at 202, of verifying user access to the program (this optional step is particularly significant for fee-based network implementations of the invention and would be readily implemented in accordance with known logon/verification schemes). The executive program would next access the student level controller, at step 203, to determine what lesson is to be delivered at the graphical user interface, and at what level of interaction. Upon establishment of the student level, the executive program will access the relevant databases (e.g., story text, audio clip, and layout) at 204 and proceed at 205 to generate a display of a portion of the lesson and the reading companion character which will audibly prompt the student to read some or all of the displayed portion of the lesson. While the text is being accessed for display at 204, the text power set database and alternate phrase and pronunciation databases are being accessed for the sets of possible responses which correspond to the text to be displayed and are being provided to the speech recognition engine at step 239.

The order in which steps 204 and 239 are conducted is arbitrary, provided that the speech recognition engine has the information it needs prior to receipt of student utterances. The steps may also be implemented such that the speech recognition engine is provided with database information corresponding to the next expected portion of text to be provided at the user interface, in advance of provision of that text for display to the user. In that way, the speech recognition engine will be prepared in advance for the expected utterances.

The executive program next waits to receive input from the student. If input is not received within a preset time frame, as determined at decision box 240, the executive program may generate a gentle reminder to proceed, at box 241, followed by another decision box 242. If no response is forthcoming within another timed interval, the program will shutdown at 243 under the assumption that the student has abandoned the terminal.

If, however, the answer at either decision box indicates that the student has responded, with the response having been received and recognized by the speech recognition engine having access to the aforementioned speech recognition enhancement databases, the executive program next evaluates the received response at box 207. If the response is not correct, the executive program may access the feedback message database and generate appropriate feedback, at 211, encouraging the reader to respond again. If the repeated response is incorrect, as determined at box 212, the executive program may generate the correct response at 213. If a correct response is received at either 207 or 212, optional positive feedback may be generated at 208. Responses received from the student and audio output, along with the visual output generated by the executive program, (collectively known as the "joint performance") are stored at the session database for replay and resumption in step 209.

After storing the current segment of the lesson, the executive program checks to see if the previously displayed text is the last portion of the lesson, at decision box 214. If there is more to the lesson, the system returns to step 205. If, however, the lesson has been completed, the executive program will, via the reading companion, inquire if the reader wishes to continue with another lesson, at step 215. If the student reader wishes to continue, the program will return to step 204 to access story text, etc. from the database. If the student does not wish to continue, the executive program may ask the user if display of the stored joint performance is desired, at step 217. Depending upon the response, the program will either display the joint performance, at step 219, or terminate the session, at 218.

The program may periodically interrupt the process flow for, or periodically perform a parallel operation of, updating the reading level information database as to the student's proficiency. In addition, the student may randomly interrupt the process flow by requesting a page overview or other "help" functions as discussed above. The interrupts are not illustrated, but the process flow in response to each of the foregoing will be readily apparent to one having skill in the art.

The invention has been described with reference to several specific embodiments. One having skill in the relevant art will recognize that modifications may be made without departing from the spirit and scope of the invention as set forth in the appended claims.

Having thus described our invention, what we claim as new and desire to secure by Letters Patent is:

1. A computer-based learning system for providing an interactive lesson between the computer and a student user comprising:

user input means including at least audio input means for delivering user speech to said system and speech recognition means associated with said audio input means;

user interface means including at least audio output means and visual output means;

program controller means for generating said interactive lesson;

a plurality of databases for access by said program controller means including at least one lesson database; and wherein said program controller means additionally comprises means for providing a prompt to pace the student through said lesson and wherein said pace is determined by said program controller assessing said student speech.

2. The system of claim 1 wherein said at least one lesson database comprises at least one lesson-based speech interpretation database comprising at least one database of anticipated incorrect student responses.

3. The system of claim 1 wherein said at least one lesson database comprises at least one lesson-based speech interpretation database comprising at least one database comprising the set of all possible combinations of correct student responses.

4. The system of claim 1 further comprising network means for providing said interactively generated lesson stored in said at least one lesson database from said computer to a remote location.

5. The system of claim 1 wherein said program controller is adapted to continually monitor student progress based on said student responses.

6. The system of claim 5 wherein said program controller is further adapted to generate student progress information based on said monitoring; and further comprising at least one storage location for storing said student progress information.

7. The system of claim 5 wherein said program controller is adapted to alter the level of interaction of the student with said lesson based upon said monitoring.

8. The system of claim 5 wherein said program controller is additionally adapted to generate at least audio output based on said monitoring.

9. The system of claim 5 wherein said program controller is further adapted to generate student progress information based on said monitoring; and further comprising at least one storage location for storing said student progress information.

10. The system of claim 5 wherein said program controller is additionally adapted to generate at least audio output based on said monitoring.

11. The system of claim 1 wherein said plurality of databases includes at least one learner-population specific acoustic model for enhanced recognition of user input.

12. The system of claim 1 wherein said plurality of databases includes a reading level information database for use by the program controller in adjusting the complexity of the interactive lesson.

13. The system of claim 1 wherein said plurality of databases includes at least one story text database including story text and phrasing indicators for use by the program controller in presenting the interactive lesson.

14. The system of claim 1 wherein said plurality of databases includes at least one story page layout database for use by the program controller in presenting said interactive lesson.

15. The system of claim 1 wherein said plurality of databases includes a session database for maintaining user session information.

16. The system of claim 15 wherein said program controller is adapted to replay segments of a user session based on input from said session database.

17. The system of claim 15 wherein said program controller receives input from said session database for establishing a starting point for said interactive lesson based on said user session information.

18. The system of claim 1 wherein said plurality of databases further comprises at least one display prompt database for use in generating audio output for user selected portions of said visual output means.

19. The system of claim 1 wherein said plurality of databases includes at least one text power set database for use by said speech recognition means for interpreting user input.

20. A computer-based learning system for providing an interactive lesson between the computer and a student user comprising:

user input means including at least audio input means for delivering user speech to said system and speech recognition means associated with said audio input means;

user interface means including at least audio output means and visual output means;

program controller means for generating said interactive lesson, for continually monitoring student progress based on said student responses, for altering the level of interaction of the student with said lesson based upon said monitoring and for providing a prompt to pace the student through said lesson, wherein said pace is determined by said monitoring;

a plurality of databases for access by said program controller means including at least one lesson database.

21. A computer-based learning system for providing an interactive lesson between the computer and a student user comprising:

user input means including at least audio input means for delivering audible user responses to said system and speech recognition means associated with said audio input means;

user interface means including at least audio output means;

program controller means for generating said interactive lesson, for continually monitoring student progress based on said student responses, for altering the level of interaction of the student with said lesson based upon said monitoring, and for providing a prompt to pace the student through said lesson, wherein said pace is determined by said monitoring;

a plurality of databases for access by said program controller means including at least one lesson database and at least one lesson storage database for storing the interactively generated lesson.

22. The system of claim 21 wherein said plurality of databases comprises at least one database of anticipated incorrect student responses.

23. The system of claim 21 further comprising at least one database of acoustic information for use by said speech recognition means in interpreting student responses.

24. A computer-based learning system for providing an interactive lesson between the computer and a student user comprising:

user input means including at least audio input means for delivering audible user responses to said system and speech recognition means associated with said audio input means;

user interface means including at least audio output means;

program controller means for generating said interactive lesson, for continually monitoring student progress based on said student responses, for generating student progress information based on said monitoring, for altering the level of interaction of the student with said lesson based upon said monitoring, and for providing a prompt to pace the student through said lesson, wherein said pace is determined by said monitoring; and a plurality of databases for access by said program controller means including at least one lesson database, a plurality of lesson-based speech interpretation databases at least comprising one database of anticipated incorrect student responses and one database comprising the set of all possible combinations of correct student responses; and at least one database of acoustic information for use by said speech recognition means in interpreting student responses.

25. A method for providing an interactive lanauage lesson between a student user and a computer having at least a program controller, speech recognition means, at least one first database for storing said lesson and at least one second database for storing lesson-based speech interpretation information, user input means for providing responses from said student user, output means for providing information relating to said lesson to said user and means for pacing the student through said lesson, comprising program controller steps of:

retrieving lesson information from said at least one first database and lesson-based speech interpretation information corresponding to said lesson information from said at least one second database;

providing lesson information to said user at said output means;

providing lesson-based speech recognition information to said speech recognition means;

prompting said student user to provide responses at said user input means;

receiving student responses from said speech recognition means;

generating an output based upon said student responses;

continually monitoring student progress based on said student responses; and altering said pacing based upon said monitoring.

26. The method of claim 25, wherein said computer further comprises at least one lesson storage database, further comprising the step of storing said interactive language lesson at said at least one lesson storage database.

27. The method of claim 26 wherein said computer further comprises visual output means, further comprising the step of displaying said interactive language lesson stored in said at least one lesson storage database.

28. The method of claim 25, wherein said computer has at least one additional database for storing student level information, and futher comprising the step of retrieving student level information from said at least one additional database; and adjusting said lesson information based upon said retrieval of student level information.

29. The method of claim 25 wherein said program controller is further adapted to generate student progress information based on said monitoring.

30. The method of claim 25 further comprising said program controller altering the prompting of said student based upon said monitoring.

31. The method of claim 25 further comprising said program controller generating at least audio output based on said monitoring.

32. An article of manufacture comprising:
  a computer usable medium having computer readable program code embodied therein for providing an interactive language lesson between a student user and a computer having at least a program controller, speech recognition means, at least one first database for storing said lesson and at least one second database for storing lesson-based speech interpretation information, user input means for providing responses from said student user, output means for providing information relating to said lesson to said user and means for placing the student user through said lesson, the computer readable program code in said article of manufacture comprising:
  computer readable program code for causing a computer to retrieve lesson information from said at least one first database and lesson-based speech interpretation information corresponding to said lesson information from said at least one second database;
  computer readable program code for providing lesson information to said user at said output means;
  computer readable program code for providing lesson-based speech recognition information to said speech recognition means;
  computer readable program code for prompting said student user to provide responses at said user input means;
  computer readable program code for receiving student responses from said speech recognition means and generating an output based upon said student responses;
  computer readable program code for continually monitoring student progress based on said student responses; and
  computer readable program code for altering said pacing based upon said monitoring.

* * * * *